US009752616B2

(12) United States Patent
Saadi et al.

(10) Patent No.: US 9,752,616 B2
(45) Date of Patent: Sep. 5, 2017

(54) BEARING SYSTEM WITH BEARING DAMPER

(71) Applicant: PRATT & WHITNEY CANADA CORP., Longueuil (CA)

(72) Inventors: Abdelkhalek Saadi, Montreal (CA); Roger Huppe, Chambly (CA); Daniel Blais, St-Jean-sur-Richelieu (CA)

(73) Assignee: PRATT & WITHNEY CANADA CORP., Longueuil (CA)

( * ) Notice: Subject to any disclaimer, the term of this patent is extended or adjusted under 35 U.S.C. 154(b) by 166 days.

(21) Appl. No.: 14/670,661

(22) Filed: Mar. 27, 2015

(65) Prior Publication Data

US 2016/0281779 A1 Sep. 29, 2016

(51) Int. Cl.
*F16C 27/04* (2006.01)
*F16C 33/10* (2006.01)
*F01D 25/18* (2006.01)
*F16C 37/00* (2006.01)
*F16C 33/66* (2006.01)
(Continued)

(52) U.S. Cl.
CPC .......... *F16C 33/1065* (2013.01); *F01D 25/16* (2013.01); *F01D 25/162* (2013.01); *F01D 25/18* (2013.01); *F01D 25/183* (2013.01); *F02C 7/06* (2013.01); *F16C 27/045* (2013.01); *F16C 33/106* (2013.01); *F16C 33/1045* (2013.01); *F16C 33/6685* (2013.01); *F16C 37/00* (2013.01); *F16C 19/26* (2013.01); *F16C 33/6659* (2013.01); *F16C 37/007* (2013.01); *F16C 2360/23* (2013.01)

(58) Field of Classification Search
CPC .............. F16C 33/1068; F16C 33/1045; F16C 33/106; F16C 33/6685; F16C 37/00; F16C 27/045; F01D 25/125; F01D 25/16; F01D 25/162; F01D 25/164; F01D 25/18; F01D 25/183
See application file for complete search history.

(56) References Cited

U.S. PATENT DOCUMENTS 3,836,215 A * 9/1974 Dopkin ................. F16C 27/045
384/99
4,265,334 A 5/1981 Benhase, Jr.
(Continued)

FOREIGN PATENT DOCUMENTS

DE 1525225 B1 6/1970
EP 1975429 A2 10/2008
EP 2530254 A2 12/2012

*Primary Examiner* — Thomas R. Hannon
(74) *Attorney, Agent, or Firm* — Norton Rose Fulbright Canada LLP

(57) ABSTRACT

A bearing system comprises a bearing configured to be mounted to a shaft. A bearing housing interfaces the bearing to a structure. An annular gap is defined between an outer annular surface of the bearing housing and the structure and configured to receive oil therein. An outlet defined in an outer section surface of the bearing housing is oriented toward a component axially spaced from the bearing. A fluid passageway between the at least one outlet and the annular gap for fluid communication therebetween. In use the fluid passageway directs pressurized oil from the annular gap to the outlet to reach the adjacent component. A method for using oil from a bearing to cool or lubricate a component axially spaced from the bearing is also provided.

13 Claims, 4 Drawing Sheets

(51) Int. Cl.
    *F01D 25/16*     (2006.01)
    *F02C 7/06*     (2006.01)
    *F16C 19/26*     (2006.01)

(56) References Cited

U.S. PATENT DOCUMENTS

| | | | |
|---|---|---|---|
| 4,378,197 A | 3/1983 | Cattaneo et al. | |
| 4,406,460 A | 9/1983 | Slayton | |
| 4,527,911 A * | 7/1985 | Davis | F01D 25/18 384/471 |
| 4,527,912 A * | 7/1985 | Klusman | F01D 25/164 384/99 |
| 4,708,602 A * | 11/1987 | McEachern, Jr. | F01D 25/164 384/474 |
| 4,838,028 A * | 6/1989 | Witt | F01D 25/125 384/99 |
| 5,149,206 A * | 9/1992 | Bobo | F01D 25/164 248/562 |
| 5,301,957 A | 4/1994 | Hwang | |
| 5,593,165 A | 1/1997 | Murray | |
| 5,797,684 A | 8/1998 | Becker | |
| 6,872,003 B2 * | 3/2005 | Dusserre-Telmon | F01D 25/164 384/99 |
| 7,040,811 B2 * | 5/2006 | Dusserre-Telmon | F16C 33/6659 384/475 |
| 8,118,570 B2 * | 2/2012 | Meacham | F02C 6/12 384/119 |
| 8,485,531 B2 | 7/2013 | Durling | |
| 8,678,741 B2 | 3/2014 | Olennikov | |
| 8,905,408 B2 | 12/2014 | Garrison | |
| 8,945,284 B2 | 2/2015 | Short et al. | |
| 2013/0078091 A1 | 3/2013 | Rees | |
| 2014/0140824 A1 | 5/2014 | Sheridan | |
| 2014/0369832 A1 | 12/2014 | Blais et al. | |
| 2016/0160924 A1 * | 6/2016 | Meyers | F01D 25/164 384/474 |

* cited by examiner

BEARING SYSTEM WITH BEARING DAMPER

TECHNICAL FIELD

The present application relates to bearings and bearing systems featuring bearing dampers in gas turbine engines.

BACKGROUND OF THE ART

Traditional bearing dampers consist of an annular chamber filled with a fluid such as oil between a structure and a bearing housing. The oil between the structure and the bearing housing may absorb some vibrations caused by a shaft supported by the associated bearings. Some bearing dampers are fed with pressurized oil in the annular chamber, the oil exiting through a radial drain, into a drain cavity. Hence, oil exiting the drain is collected by the drain cavity to then be returned to a tank for being reused in the bearing damper.

In parallel, some components require an oil source and associated hardware for cooling, for lubricating. Such components may add weight, cost and complexity to the a gas turbine engine.

SUMMARY

In one aspect, there is provided a bearing system comprising: a bearing configured to be mounted to a shaft; and a bearing housing configured to interface the bearing to a structure, an annular gap being defined between an outer annular surface of the bearing housing and the structure and configured to receive oil therein, at least one outlet defined in an outer section surface of the bearing housing and oriented toward a component axially spaced from the bearing, and at least one fluid passageway between the at least one outlet and the annular gap for fluid communication therebetween; whereby in use the at least one fluid passageway directs pressurized oil from the annular gap to the at least one outlet to reach the adjacent component.

In a second aspect, there is provided a method for using oil from a bearing to cool or lubricate a component axially spaced from the bearing, comprising: receiving oil in an annular gap between a bearing and a structure; directing the oil exiting from the annular gap to at least one outlet oriented toward the component; and exhausting the oil via the at least one outlet for the oil to project onto the component.

Further details of these and other aspects of the present invention will be apparent from the detailed description and figures included below.

DESCRIPTION OF THE DRAWINGS

Reference is now made to the accompanying figures, in which.

DETAILED DESCRIPTION OF THE PREFERRED EMBODIMENTS

Figure 1:
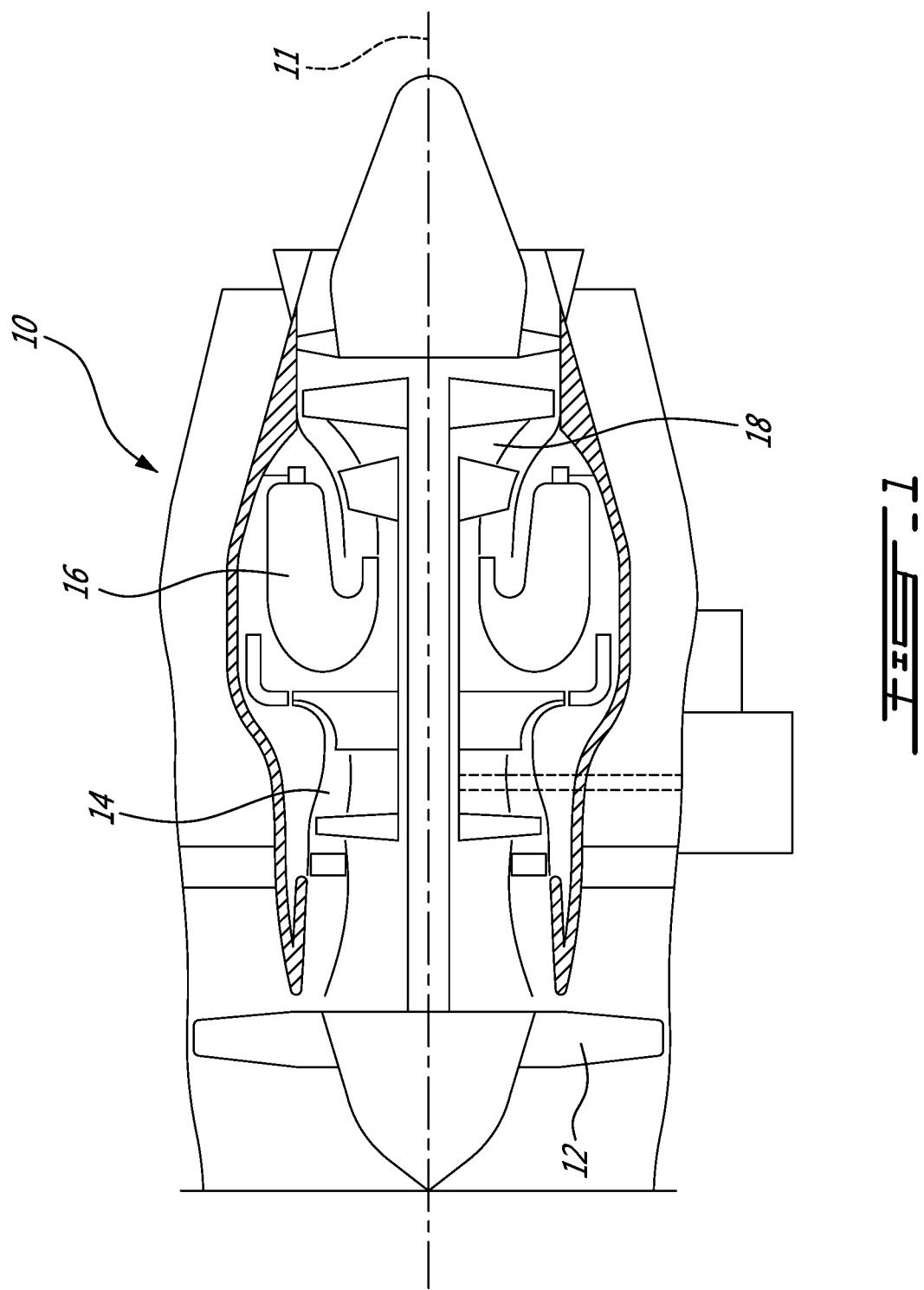
FIG. 1 is a schematic cross-sectional view of a turbofan gas turbine engine.

FIG. 1 illustrates a turbofan gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases. The compressor 14 and the turbine section 18 are illustrated as having concentric superposed shafts rotating about longitudinal axis 11.

Figure 2:
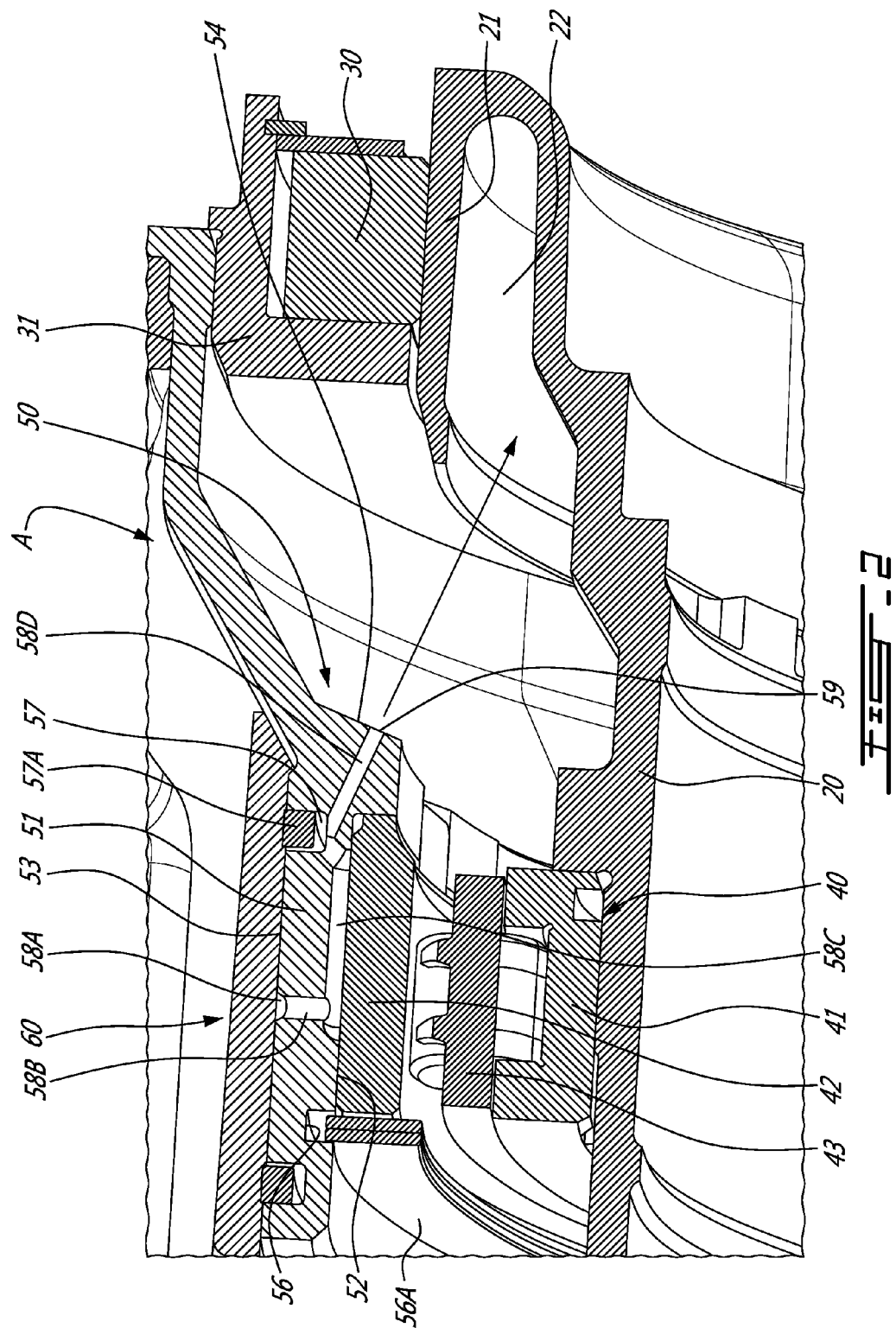
FIG. 2 is a sectional view of an assembly of a bearing system and shaft according to the present disclosure.

Referring to FIG. 2, a bearing system of the present disclosure is generally shown at A, and is of the type comprising a bearing damper. The bearing system A may be used as part of an assembly featuring a set of shaft 20 and seal 30, to cool or lubricate this set with oil from its bearing damper. The oil when then be collected by a scavenge system.

The shaft 20 may be of the type found in FIG. 1, for the compressor 14 or the turbine section 18, although the shaft 20 may be that of other parts of the gas turbine engine. In FIG. 2, the shaft 20 is shown as being a concentric superposed shaft, although a single stand-alone shaft could also use the bearing system A. The shaft 20 is illustrated as having a monolithic seal runner 21 at its end, with which it forms an annular cavity 22.

The seal 30 is positioned against an outer surface of the seal runner 21 and is supported by seal support 31. The seal 30 is in contact against the surface of the seal runner 21. The seal support 31 is conventionally supported by a structure of the gas turbine engine 10. Because of the relative movement between the seal 30 and seal runner 21, there is friction and thus heat generated therebetween.

Figure 3:
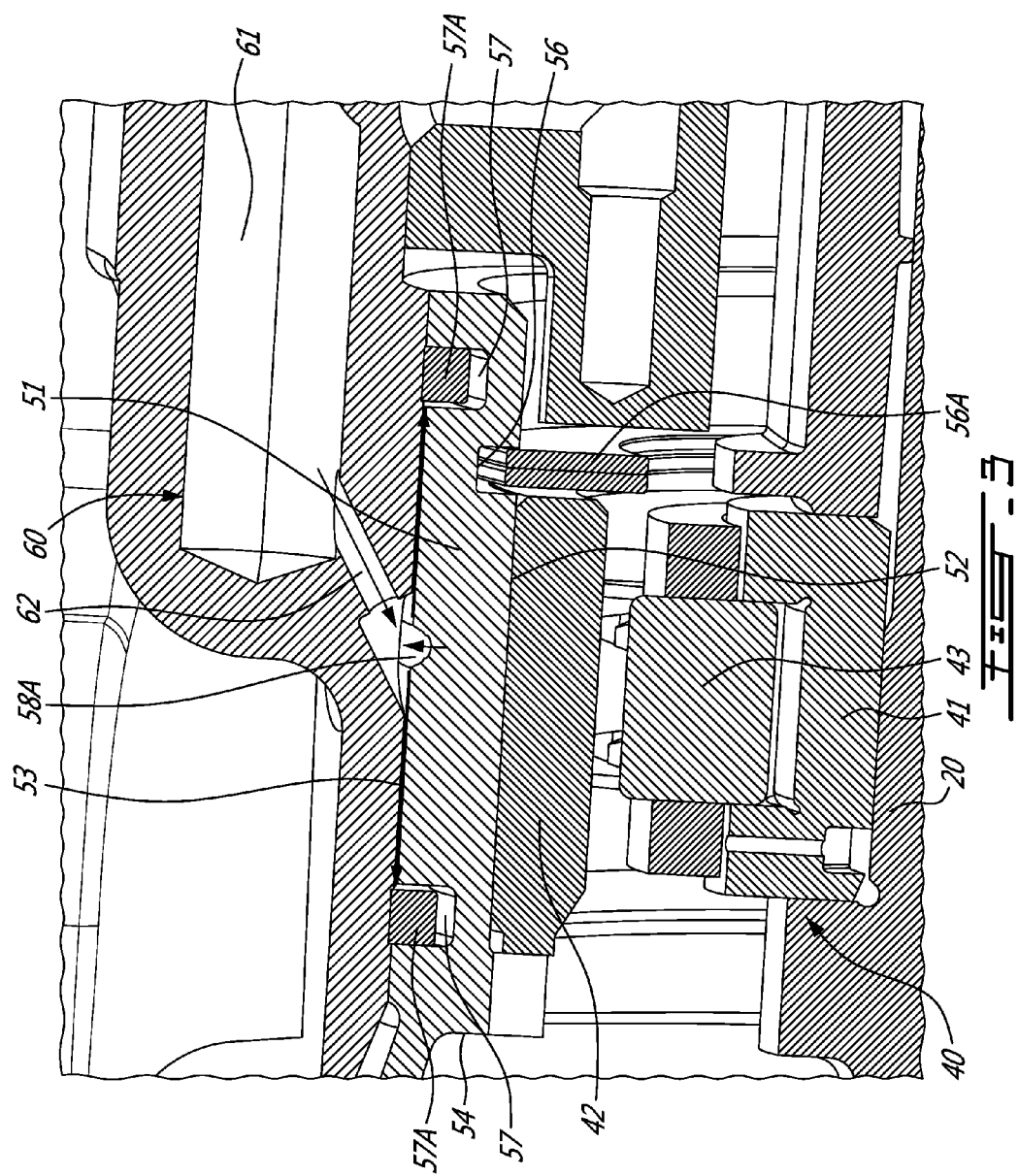
FIG. 3 is an enlarged sectional view of an oil feed to a bearing damper of the bearing system of the present disclosure.
Figure 4:
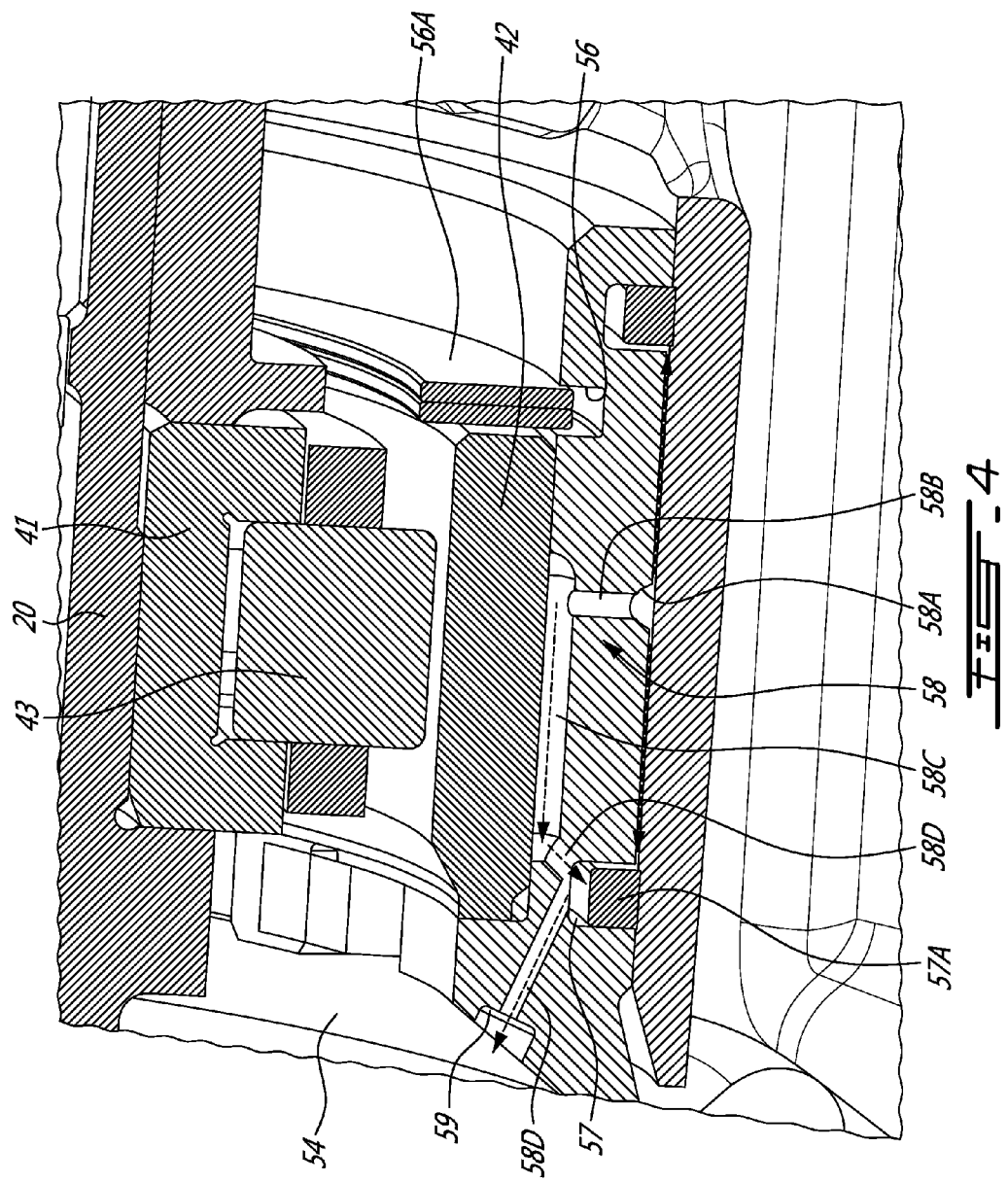
FIG. 4 is an enlarged sectional view of an oil outlet of the bearing system of the present disclosure.

The bearing system A aims to provide cooling oil from its bearing damper to cool the seal runner 21. Referring concurrently to FIGS. 2 to 4, the bearing system A is shown as having a bearing 40, and a bearing housing 50. The bearing system A may be supported by the annular structure 60, which may for instance be part of the structure of the gas turbine engine 10.

The bearing 40 rotatably supports the shaft 20, such that the shaft 20 rotates about its longitudinal axis.

The bearing housing 50 interfaces the bearing 40 to the annular structure 60, and has therein features of the bearing damper.

The annular structure 60 supports the shaft 20, the bearing 40 and the bearing housing 50 within the gas turbine engine 10.

The bearing 40 is axially spaced from the seal runner 21 along the shaft 20, with an unused free space (a vacant space) therebetween. The bearing 40 has an inner race 41, an outer race 42 and rolling components 43. The inner race 41, the outer race 42 and the rolling component 43 are schematically illustrated in the figures as the bearing system A may operate with any suitable type of bearing of similar configuration. For example, the rolling components 43 may be rollers, balls, needles, among numerous possible configurations. Moreover, more than one of the bearings 40 could be used in the bearing system A. The bearing 40 is held in position along the shaft 20 by way of a shoulder that is monolithically formed into the shaft 20 as well as a coupling sleeve that may be threadingly engaged to the shaft 20. Other configurations are considered as well at the junction between the shaft 20 and the bearing 40.

The bearing housing 50 may have an annular body 51 (such as a cylindrical body) with an inner annular surface 52 and an outer annular surface 53. The inner annular surface 52 is sized so as to be in close-fitting contact with the outer race 42 of the bearing 40, e.g., force fit, interference fit, etc.

The outer annular surface 53 is sized to form a sealed annular gap with the annular structure 60, the sealed annular gap being part of the bearing damper. One of the section surfaces is illustrated at 54, and faces toward the annular cavity 22 of the shaft 20. The section surface 54 may be an end surface of the bearing housing 50. The section surface 54 could be a radial surface—i.e., the longitudinal axis of the shaft 20 could be normal to a plane of the radial surface—although it is not in the figures.

The bearing housing 50 may also have a groove 56 in its inner annular surface 52, so as to receive a retaining ring 56A (or equivalent, e.g., circlip, internal ring, etc), by which the bearing 40 may be held captive in the bearing housing 50, with an opposite end of the bearing 40 being in abutment with a shoulder in a wall incorporating the section surface 54, although other arrangements are considered as well.

Annular seal grooves 57 are defined in the outer annular surface 53 of the bearing housing 50. The grooves 57 are designed to receive seals 57A therein, to delimit the sealed annular gap. Any appropriate type of seal (cup, wiper, O-ring, etc) may be used provided it is compatible with the selected fluid and its operational parameters (temperature, pressure, etc). Accordingly, a liquid such as oil may be received therein and held captive by the seals 57A. When oil is in the sealed annular gap, the bearing system A performs a damping function, and may be referred to as having a bearing damper. It is pointed out that grooves could alternatively be formed into the annular structure 60 to delimit the sealed annular gap.

A fluid passageway is generally shown at 58 and may have a plurality of portions, by which fluid may travel from the sealed annular gap to outlet 59 (a.k.a, jet, exhaust, nozzle, etc). As a non-limitative example, an annular groove 58A is in the outer annular surface 53. The annular groove 58A may be generally centrally located relative to the annular grooves 57. The annular groove 58A forms a trough-like guide for fluid, to direct same to a throughbore 58B. The throughbore 58B may be substantially radially oriented in the bearing housing 50, although other orientations are considered as well, and acts as a drain hole for the sealed annular gap. However, the throughbore 58B is sized so as to create a throat, enabling pressure to build upstream thereof, i.e., in the sealed annular gap. In this manner, the oil performs its bearing damper function.

The fluid passageway 58 may also comprise an axial groove 58C formed in the inner annular surface 52 of the bearing housing 50. The axial groove 58C forms a conduit with an outer surface of the outer race 42 of the bearing 40. Although the axial groove 58C is illustrated as having an axial orientation, other orientations are also considered.

The fluid passageway 58 may also comprise a conduit 58D formed in the bearing housing 50. The conduit 58D may have an intake end in fluid communication with the axial groove 58C, and may be in fluid communication with the outlet 59 to output the oil. In FIGS. 2 and 4, the conduit 58D is shown as having an elbow, by which it is in fluid communication with the annular groove 57. This may allow pressurized oil to exert pressure on the seal 57A in the annular groove 57.

The conduit 58D emerges out of the section surface 54 of the bearing housing 50, at the outlet 59. In FIG. 2, the outlet 59 consists of a counterbore in the body of the bearing housing 50, to cause a pressure drop for the oil exiting the fluid passageway 58. The outlet 59 may have any appropriate configuration to output oil onto an adjacent component, and this may include simply having the conduit 58D emerge straight out of the section surface 54.

The fluid passageway 58 may have one or more of the annular groove 58A, the throughbore 58B, the axial groove 58C and the conduit 58D and thus, one or more outlets 59 could be present based on the number of conduits 58D, provided that an oil pressure may be maintained in the sealed annular gap for the bearing damper function. It is observed that the conduit 58D and/or the outlet 59 are oriented toward the set of seal runner 21 (and annular cavity 22) and seal 30, such that a spray, mist, jet of oil reaches the set, thereby cooling and/or lubricating same. Moreover, although the embodiment has the fluid passageway 58 with various features, a more direct passageway could be used as well, such as a straight or relatively straight conduit from the bearing damper to the outlet in the section surface 54.

Referring to FIG. 3, the annular structure 60 may have an oil reservoir 61 with a conduit 62 in fluid communication with the sealed annular gap or with the fluid passageway 58. In an embodiment, the oil reservoir 61 is pressurized so as to produce an output of pressurized oil, i.e., oil with a motive pressure that makes the oil seek a passage toward lower pressure. Any appropriate device or arrangement may be used to pressurize the reservoir 61 for oil to be urged out and into the bearing damper and fluid passageway 58, e.g., scavenging pressurized air from other engine locations, use of a pump, etc.

In an embodiment, oil therefore flows out of the reservoir 61, and through the conduit 62 to reach the sealed annular gap and hence enable the assembly to perform a damping function. Some oil from the sealed annular gap may escape same by taking the fluid passageway 58. In the embodiment of FIGS. 2-4, oil sequentially moves from the annular groove 58A, to the throughbore 58B, to the axial groove 58C, to the conduit 58D (optionally into the annular groove 57) is output by the outlet 59. As the oil is pressurized, it may mist, spray, disperse when exiting the outlet 59, to travel to the component to be lubricated or cooled.

The above description is meant to be exemplary only, and one skilled in the art will recognize that changes may be made to the embodiments described without departing from the scope of the invention disclosed. For example, although the axially spaced component that benefits from the oil dispersion from the bearing system A is a seal runner/seal, it is considered to use this oil dispersion with other components, such as gears, other bearings, splines, etc, whether it be to cool or lubricate these axially-spaced components. While oil is described as being the fluid in the system, other types of fluids with appropriate characteristics may be used as well. Still other modifications which fall within the scope of the present invention will be apparent to those skilled in the art, in light of a review of this disclosure, and such modifications are intended to fall within the appended claims.

What is claimed is:
1. A bearing system comprising:
a bearing configured to be mounted to a shaft; and
a bearing housing configured to interface the bearing to a structure by being connected to an outer race of the bearing, an annular gap being defined between an outer annular surface of the bearing housing and the structure and configured to receive oil therein, at least one outlet defined in an outer section surface of the bearing housing and oriented toward a component axially spaced from the bearing, and at least one fluid passageway between the at least one outlet and the annular gap for fluid communication therebetween;

whereby in use the at least one fluid passageway directs pressurized oil from the annular gap to the at least one outlet to reach the adjacent component.

2. The bearing system according to claim 1, wherein the at least one fluid passageway has an annular groove in the outer annular surface of the bearing housing.

3. The bearing system according to claim 2, wherein the at least one fluid passageway has at least one radial throughbore extending from the annular groove in the outer annular surface of the bearing housing to an inner annular surface thereof, and an axial groove defined in the inner annular surface.

4. The bearing system according to claim 1, wherein the at least one fluid passageway has at least one radial throughbore extending from the outer annular surface of the bearing housing to an inner annular surface thereof, and an axial groove defined in the inner annular surface.

5. The bearing system according to claim 1, wherein the bearing housing has a cylindrical body portion comprising the outer annular surface.

6. The bearing system according to claim 4, wherein the outer race of the bearing and the inner annular surface of the bearing housing are in close-fitting contact to concurrently form a sealed surface for the axial groove.

7. The bearing system according to claim 1, wherein the annular gap forms a bearing damper in use with oil therein.

8. The bearing system according to claim 1, further comprising a pair of annular sealing grooves in the outer annular surface of the bearing housing configured to receive annular seals, the annular sealing grooves delimiting the annular gap.

9. The bearing system according to claim 8, wherein the at least one fluid passageway is in fluid communication with at least one of the pair of annular sealing grooves for pressurizing the annular seal therein against the structure.

10. The bearing system according to claim 8, wherein one of the annular sealing grooves is in fluid communication with the at least one outlet separately from the at least one passageway.

11. The bearing system according to claim 1, wherein the outer section surface is an axial end surface of the bearing housing.

12. The bearing system according to claim 1, wherein the at least one outlet has a counterbore at an end of a conduit of the fluid passageway.

13. An assembly of a bearing system and shaft comprising:
a shaft having a component thereon;
the bearing system according to claim 1.

* * * * *